May 29, 1923.  1,457,060

M. G. GARDONYI

MILK BOTTLE HOLDER

Filed Aug. 21, 1922  3 Sheets-Sheet 1

Inventor
Mike G. Gardonyi
By
Attorney

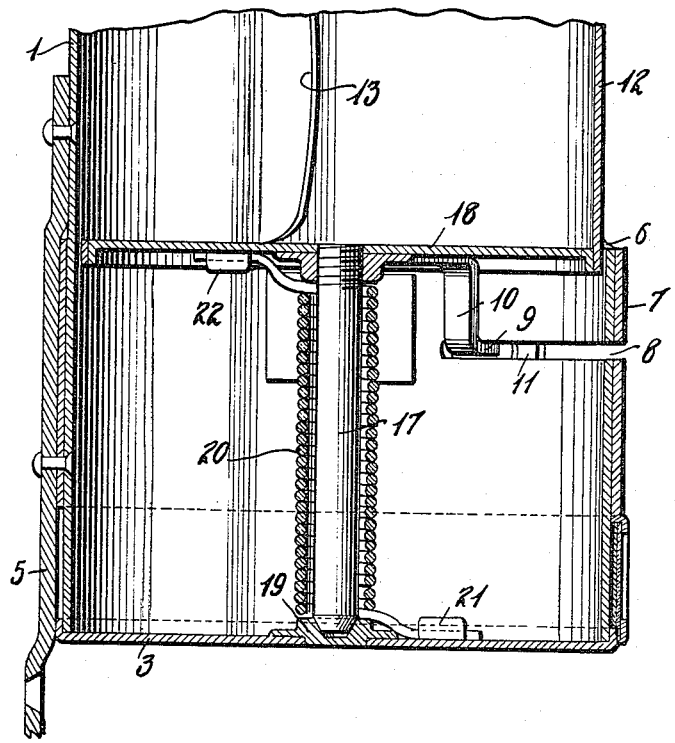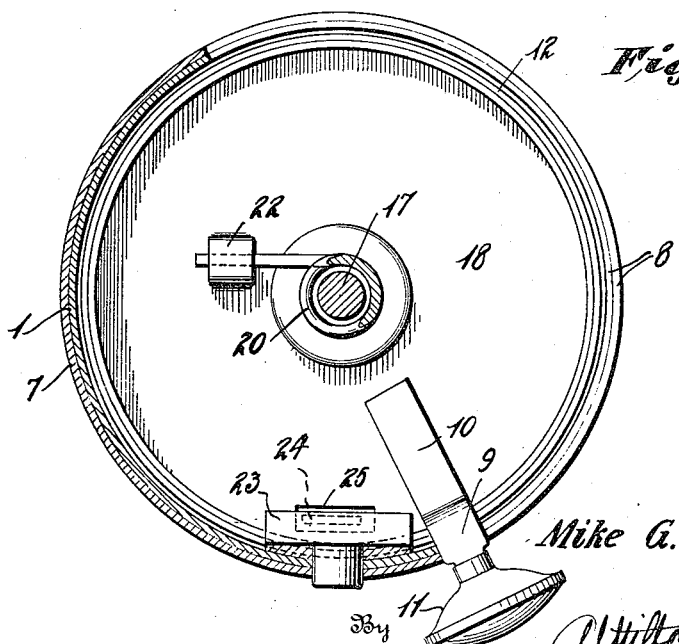

May 29, 1923.

M. G. GARDONYI

MILK BOTTLE HOLDER

Filed Aug. 21, 1922   3 Sheets-Sheet 3

1,457,060

Inventor
Mike G. Gardonyi

By
Attorney

Patented May 29, 1923.

1,457,060

UNITED STATES PATENT OFFICE.

MIKE G. GARDONYI, OF CLEVELAND, OHIO.

MILK-BOTTLE HOLDER.

Application filed August 21, 1922. Serial No. 583,229.

*To all whom it may concern:*

Be it known that I, MIKE G. GARDONYI, a citizen of the United States, residing at Cleveland, in the county of Cuyahoga and State of Ohio, have invented certain new and useful Improvements in a Milk-Bottle Holder, of which the following is a specification.

This invention has relation to certain new and useful improvements in a milk bottle holder of the type in which the filled milk bottle is completely enclosed by and locked in the holder until removed by an authorized party carrying the key to the holder.

The invention has for an object the provision of a milk bottle holder of the character stated which will be of comparatively simple and inexpensive construction and which may be composed of aluminum or some other suitable material of light weight so that the holder may be secured upon a door casing or other permanent support.

The invention has for another object the provision of a milk bottle holder of the character stated which will be of such construction that the door of the bottle receiving compartment may be retained in open position when the empty bottle is suspended on the empty bottle hook but may readily close to be automatically locked in closed position when the empty bottle is removed from the empty bottle hook so as to enclose and protect the filled bottle of milk or cream.

The invention has for a further object the provision of a milk bottle holder of the character set forth in which the bottle receiving compartment may be provided with an opening to permit the insertion or removal of a milk bottle when the door of the opening is open.

A further object of the invention resides in the provision of a milk bottle holder of the character stated which will include a rotatable bottle receiving member within the main casing and a portion of the cylindrical wall of which member serves as the door for closing the bottle passage or door opening in the main casing when the bottle receiving member is in normal or closed position.

The invention has for a further object the provision of a milk bottle holder of the character set forth in which will be included means controlled by the empty bottle supporting hook for retaining the filled bottle receiving member in open position when an empty bottle is suspended upon the hook but which will automatically release said member when the hook is relieved of the weight of the empty bottle, the rotatable filled bottle receiving member automatically returning to its closed or normal position and locking in this position when released by movement of the hook to its normal position.

The invention has for a still further object the provision of a milk bottle holder of the character set forth in which will be included a novel form of main casing and rotatable filled bottle receiving member with means for resiliently retaining said member in its normal or closed position and additional means for locking said member in its closed or normal position and preventing opening of the holder by unauthorized parties.

A still further object of the invention resides in the provision of a milk bottle holder of the character set forth which will be of such construction that it may be readily operated by the party delivering the milk by placing the fresh or filled bottle of milk in the filled bottle receiving member and then removing the empty bottle from the supporting hook so as to permit automatic closing and locking of the holder with the filled bottle of milk enclosed and protected by the same.

With the foregoing and other objects in view, as will appear as the description proceeds, the invention consists in the novel construction, combination and arrangement of co-operating elements as hereinafter more specifically set forth, claimed and shown in the accompanying drawings forming a part of the present application and in which:—

Fig. 2 is an enlarged detail vertical section on the plane of line 2—2 of Fig. 1, looking in the direction indicated by the arrows.

Fig. 3 is a horizontal section on the plane of line 3—3 of Fig. 1, looking in the direction indicated by the arrows.

Figures 1, 7:
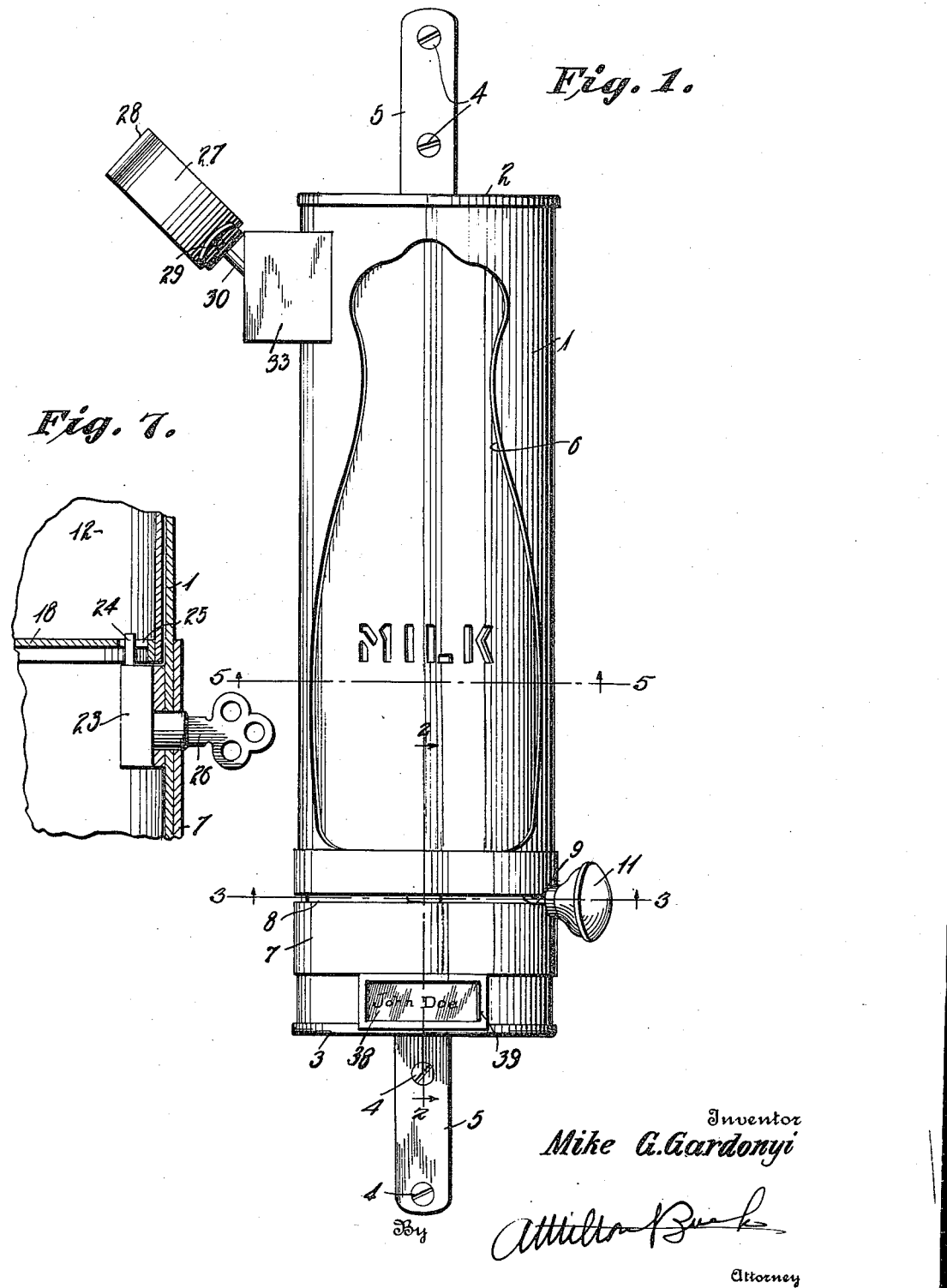
Fig. 1 is an elevation of the complete device in its normal or closed condition.
Fig. 7 is an enlarged detail section through a portion of the device, showing the manner of locking the filled bottle receiving member in closed position.

Referring more in detail to the drawings in which similar reference characters designate corresponding parts throughout the several views, 1 indicates the stationary main casing which is of substantially cylindrical form with its upper and lower ends closed by the caps 2 and 3, respectively. This casing is adapted to be secured to a door casing or other permanent stationary support by suitable securing members 4 passed through the upwardly and downwardly directed strips 5, which are in turn permanently secured to the rear side of the casing 1, as shown clearly in Fig. 2 of the drawings. These bracket strips 5 extend above and below the ends of the casing 1, as shown in Figs. 1 and 2. Fig. 1 also discloses clearly the door opening 6 in the front side of the casing 1 and which may correspond with the shape of a conventional form of milk bottle, as shown or may be of any shape desired. A band 7 is secured around the lower portion of the casing 1, below the door opening 6 to reinforce this portion of the casing 1, as shown in the drawings. An elongated slot 8 is formed through the sleeve 7 and the opposite portion of the casing 1 to serve as a guide slot for the outwardly directed portion 9 of the handle 10 working through the slots 8, as shown in Figs. 1, 2 and 3. A knob 11 is secured upon the outer end of the handle 10, whereby this handle 10 may be moved along the slots 8, as desired.

Rotatably mounted in the main portion of the casing 1 and extending from the upper end thereof, to a point below the bottom of the door opening 6, is the rotatable filled bottle receiving member 12. This member 12 has an open side 13 corresponding with the door opening 6 of the casing 1. The member 12 is adapted to be rotated by means of the knob 11 to bring the open side 13 thereof into registration with the door opening 6 for the purpose of inserting or removing the bottle, as will be later clearly understood. In order to provide for proper mounting of the member 12 within the casing 1, a centering pin 14 extends upwardly through the upper head 15 of the rotatable member 12 and has its pointed upper extremity engaged in a bearing member 16 carried on the inner face of the upper cap 2 of the casing 1, as shown clearly in Fig. 4. A lower centering pin 17 is threaded in the bottom member 18 of the member 12 and the lower beveled end of this centering pin 17 rests in a bearing member 19 carried on the inner face of the lower cap 3 for the casing 1, as shown clearly in Fig. 2 of the drawings. The handle 10 is turned and secured to the under face of the bottom member 18 of the member 12, as shown in Fig. 2, whereby the member 12 may be readily turned to open position by operation of the handle 10 in the slots 8. The member 12 is resiliently retained in its closed or normal position by means of the spring 20 extended around the centering pin 17 and having one end secured to the bottom cap 3, as shown at 21 while its opposite or upper end is secured in a suitable manner to the under face of the bottom member 18 of the member 12, as shown at 22. In order to provide for a locking of the member 12 in its normal or closed position, a suitable locking mechanism 23 is provided with the locking bolt 24 thereof normally extended to project through the bolt opening 25 near the edge of the bottom member 18 of the member 12. This locking mechanism 23 should be of such type as to require a special key 26 to withdraw the bolt 24 from the slot 25.

Figure 4:
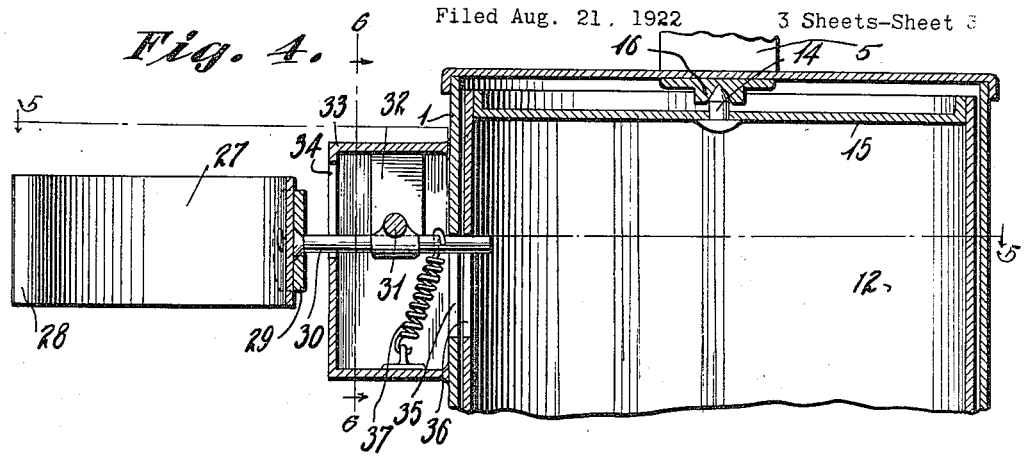
Fig. 4 is an enlarged detail section on the plane of line 4—4 of Fig. 5, looking in the direction indicated by the arrows.
Figure 5:
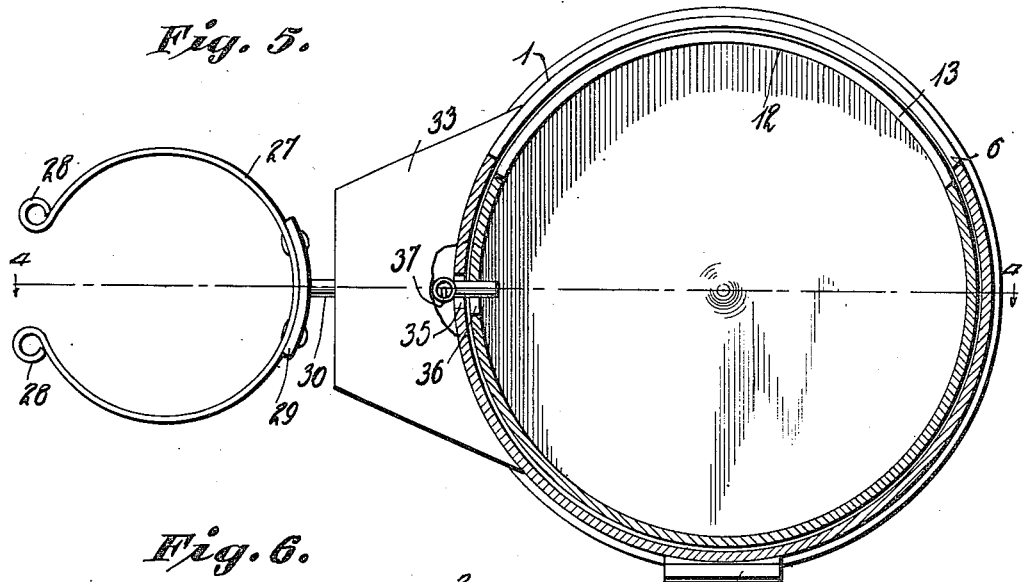
Fig. 5 is a horizontal enlarged section on the plane of line 5—5 of Fig. 4, looking in the direction indicated by the arrows.
Figure 6:
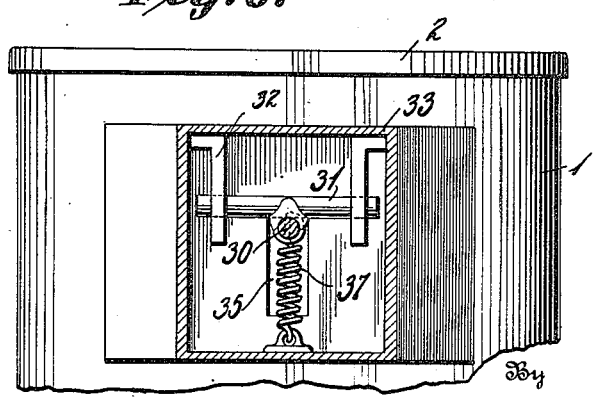
Fig. 6 is a detail section on the plane of line 6—6 of Fig. 4, looking in the direction indicated by the arrows.

In order to support an empty bottle on the side of the casing 1 when the member 12 is in open position, I have provided a suspending hook 27 which is of arcuate form and preferably composed of spring metal. The ends of the hook 27 are turned back, as shown at 28, to permit the ready insertion of the neck portion of the milk bottle in the hook 27 or removal of the milk bottle from the hook, as desired. This hook 27 has its central portion secured upon a plate 29 mounted on the rod 30. This rod 30 is pivotally mounted intermediate its ends, on the supporting rod 31. This supporting rod 31 is mounted in supporting brackets 32 positioned in an auxiliary casing 33 carried on the main casing 1, to one side of the door opening 6 and near the upper end of said casing 1. The rod 30 works through a slot 34 in the outer side of the auxiliary casing 33 and also through a slot 35 in the main casing 1. When the rod 30 is in horizontal position, as shown in Figs. 4, 5 and 6, the inner end of the rod 30 also extends through the slot 36 in the side or vertical portion of the member 12 to retain the member 12 in open position. A tension spring 37 is employed to resiliently retain the rod 30 in an inclined position with the hook 27 raised, as shown in Fig. 1. This spring 37 is located in the auxiliary casing 33 and has one end secured to the lower portion of said casing 33 while its opposite end is secured to the rod 30, inwardly of the supporting rod 31, as shown clearly in Figs 4 and 6. It will be evident from these views that the weight of a bottle suspended on the hook 27 is necessary in order to retain the rod 30 in horizontal position and thereby hold the member 12 in open position. The slots 34, 35 and 36 are all extended vertically and it is therefore evident that when the member 12 is in closed position, the rod 30 cannot be forced to its horizontal position.

It is believed the complete construction and operation may now be apparent from the foregoing paragraphs taken in connection with the accompanying drawings without further detail description. The operation may be briefly stated, however, as follows. The customer, whose name plate 38 may be positioned in the name plate or card receiving frame 39 mounted on the outer side of the casing 1, near the bottom thereof, as shown in Figs. 1 and 2, may insert the key 26 in the locking mechanism 23 and withdraw the bolt 24 from the bolt opening or slot 25. The knob 11 may then be employed for rotating the member 12 to open position. Then the hook 27 may be pulled down to horizontal position, forcing the rod 30 through the slots 35 and 36 to hold the member 12 in its open position. This hook 27 and rod 30 may then be retained in horizontal position by the weight of an empty bottle placed on the hook 27. The holder is then ready to receive the filled milk bottle which may be inserted through the openings 13 and 6 of the member 12 and casing 1, respectively, and placed upon the bottom member 18 of the member 12.

After placing the filled bottle within the member 12, the deliveryman simply withdraws the empty bottle from upon the hook 27, permitting the spring 37 to operate to swing the hook 27 and rod 30 to their normal or inclined position and thereby release the member 12. The spring 20 then acts to return the member 12 to its normal or closed position. The locking mechanism 22 will operate immediately to force the locking bolt 24 through the opening or slot 25 and automatically lock the member 12 in its closed position, thoroughly enclosing and protecting the filled milk bottle and bringing the word "Milk" opposite the opening 6 of the casing 1, as shown in Fig. 1 of the drawings, to notify the customer that a new bottle of milk has been placed in the casing. This word "Milk" may be cut into the member 12, as shown at 40 in the drawings or provided on this member 12 in any suitable and well known manner. The device can, after locking of the member 12 in closed position, only be opened by an authorized party having the proper key 26 and the hook 27 cannot be again lowered to its horizontal position for supporting another empty bottle until the device is unlocked and open. It is believed that further detailed description is unnecessary.

While the preferred embodiment of the invention has been shown and described, it is to be understood that minor changes in the details of construction and arrangement of parts may be resorted to within the scope of what is claimed without departing from the spirit of the invention.

What I claim is:

1. A milk bottle holder comprising a casing, a rotatable receiving member within said casing, means for locking said receiving member in one position within said casing, a bottle supporting member carried by said casing, said bottle supporting member being adapted when in one position to retain the rotatable member in open position, and means to return said rotatable member to closed position when released from said bottle supporting member.

2. A milk bottle holder comprising a casing, means for supporting the casing on a stationary member, a rotatable member within said casing, said casing having a door opening, said rotatable member having an opening adapted to register with said door opening when said rotatable member is in one position, a pivoted supporting member carried by said casing and adapted to retain said rotatable member in said position when the supporting member is in use, means to automatically move the said rotatable member to its reversed position when released from said supporting member, and means to automatically lock said rotatable member in the last mentioned member.

3. A milk bottle holder comprising a stationary casing, means for mounting said stationary casing upon a permanent support, a rotatable receiving member mounted in said casing, said casing and said receiving member having openings adapted to register at times, an empty bottle supporting member pivotally mounted on said casing and adapted when in one position to retain the rotatable receiving member in open position with the opening thereof registering with the opening of said casing, means to automatically return said empty bottle supporting member to inoperative position upon removal of the bottle therefrom, means to automatically return said rotatable member to closed position when released from said empty bottle supporting member, and means to automatically lock said rotatable member in closed position and prevent opening thereof by unauthorized parties.

4. A milk bottle holder comprising a stationary casing, means for mounting said stationary casing upon a permanent support, a rotatable receiving member mounted in said casing, said casing and said receiving member having openings adapted to register at times, an empty bottle supporting member pivotally mounted on said casing and adapted when in one position to retain the rotatable receiving member in open position with the opening thereof registering with the opening of said casing, means to automatically return said empty bottle supporting member to inoperative position upon removal of the bottle thereof, and means to automatically return said rotatable member to closed position when released from said empty bottle supporting member.

5. A milk bottle holder comprising a stationary casing, means for mounting said stationary casing upon a permanent support, a rotatable receiving member mounted in said casing, said casing and said receiving member having openings adapted to register at times, an empty bottle supporting member pivotally mounted on said casing and adapted when in one position to retain the rotatable receiving member in open position with the opening there registering with the opening of said casing, and means to automatically return said empty bottle supporting member to inoperative position upon removal of the bottle therefrom and permit automatic closing and locking of said rotatable member with a filled bottle therein.

6. A milk bottle holder comprising a casing having its ends closed and a door opening in one side thereof, means for mounting said casing on a stationary support, an article receiving member rotatably mounted in said casing and having an open side and a closed side, said member when in open position having its open side registering with the side opening of the casing, a pivoted article supporting member mounted on said casing and adapted when in use to retain said article receiving member in open position, means for removing said pivoted article supporting member to inoperative position when not in use and releasing said rotatable article receiving member, means to resiliently retain said rotatable article receiving member in closed position, means to lock said rotatable article receiving member in closed position, and operating handle carried by said rotatable article receiving member to move the same to open position for engagement by said pivoted article receiving member when said rotatable article receiving member is unlocked, said casing having a guide slot for said handle, said handle extending through said slot, reinforcing members for said casing, and a card supporting member mounted on said casing.

7. A milk bottle holder comprising a cylindrical casing having an open side, end caps for closing the ends of said casing, means for mounting said casing on a stationary support, a cylindrical article receiving member within said casing and having an open side adapted to register with the open side of said casing when said member is in open position to receive an article or permit removal thereof, end members for said rotatable article receiving member, centering means for the ends of said rotatable article receiving member, means for normally locking said rotatable article receiving member in closed position and preventing opening thereof by unauthorized parties, means extending from said rotatable article receiving member for moving the same to open position, said last mentioned means working through a slot provided therefor in said casing, a pivoted article supporting member mounted on said casing and adapted at times to engage said rotatable article receiving member and retain the latter in open position, means for moving said pivoted article supporting member to inoperative position when not in use and thereby releasing said rotatable article receiving member, and means to automatically return said rotatable article receiving member to closed position when released from said pivoted article supporting member.

In testimony whereof, I affix my signature.

MIKE G. GARDONYI.